US012667997B2

(12) United States Patent
Toncelli

(10) Patent No.: US 12,667,997 B2
(45) Date of Patent: Jun. 30, 2026

(54) MOULDING TRAY FOR MANUFACTURING SLABS MADE OF AGGLOMERATE MATERIAL, METHOD FOR REALIZING SUCH MOULDING TRAY AND METHOD FOR MANUFACTURING SLABS MADE OF AGGLOMERATE MATERIAL

(71) Applicant: Dario Toncelli, Bassano del Grappa (IT)

(72) Inventor: Dario Toncelli, Bassano del Grappa (IT)

( * ) Notice: Subject to any disclaimer, the term of this patent is extended or adjusted under 35 U.S.C. 154(b) by 763 days.

(21) Appl. No.: 17/919,012

(22) PCT Filed: Apr. 20, 2021

(86) PCT No.: PCT/IB2021/053231
§ 371 (c)(1),
(2) Date: Sep. 5, 2023

(87) PCT Pub. No.: WO2021/214644
PCT Pub. Date: Oct. 28, 2021

(65) Prior Publication Data
US 2023/0405870 A1      Dec. 21, 2023

(30) Foreign Application Priority Data

Apr. 24, 2020      (IT) ........................ 102020000008953

(51) Int. Cl.
*B28B 7/34* (2006.01)
*B28B 11/24* (2006.01)
(Continued)

(52) U.S. Cl.
CPC .............. *B28B 7/348* (2013.01); *B28B 7/346* (2013.01); *B28B 11/24* (2013.01); *B32B 5/024* (2013.01);
(Continued)

(58) Field of Classification Search
CPC ................................ B28B 7/348; B28B 7/346
See application file for complete search history.

(56) References Cited

U.S. PATENT DOCUMENTS 3,989,790 A * 11/1976 Bruner ................ B29C 33/3857
264/225
2008/0116617 A1* 5/2008 Toncelli ................ B29C 67/244
264/444
(Continued)

FOREIGN PATENT DOCUMENTS

EP        1995030 A2    11/2008
IT        0001297285 B    4/1999
(Continued)

OTHER PUBLICATIONS

Jerschow, P., "Silicone Elastomers," a RAPRA Industry Analysis Report, RAPRA Review Reports, United Kingdom, vol. 12, No. 5, Jan. 1, 2001, pp. 1-66.
(Continued)

*Primary Examiner* — Virak Nguon
(74) *Attorney, Agent, or Firm* — Fredrikson & Byron, P.A.

(57) ABSTRACT

Moulding tray (1) for manufacturing slabs of agglomerate material from a mix, comprising a base portion (2) and a rim portion (4) designed to define a cavity (6) for containing the mix. The rim portion (4) is made of elastomeric material and the base portion (2) comprises at least one surface layer (8A) made of elastomeric material and at least one fabric layer (10A). The elastomeric material of the rim portion (4) and the elastomeric material of the at least one layer (8A) of the base portion (2) comprise a filler containing silicon (Si), preferably silica. The invention also relates to a method for realizing the moulding tray (1) and a method for manufacturing slabs of agglomerate material which uses such a moulding tray (1).

21 Claims, 3 Drawing Sheets

(51) Int. Cl.
　　　B32B 5/02　　　　(2006.01)
　　　B32B 25/10　　　　(2006.01)

(52) U.S. Cl.
　　　CPC ........ B32B 25/10 (2013.01); *B32B 2264/101*
　　　　　　　　　　　　　　　　　　(2013.01)

(56)　　　　　　　References Cited

U.S. PATENT DOCUMENTS

2015/0360425 A1*  12/2015  Guha ...................... B29C 43/02
　　　　　　　　　　　　　　　　　　　　264/550
2019/0240874 A1*   8/2019  Yang ................... B29C 33/3842

FOREIGN PATENT DOCUMENTS

| | | | |
|---|---|---|---|
| IT | 0000248137 | B | 6/2001 |
| IT | TV2004A000019 | | 8/2005 |
| WO | 2006013589 | A1 | 2/2006 |
| WO | 2012056359 | A1 | 5/2012 |

OTHER PUBLICATIONS

PCT International Search Report and Written Opinion dated Aug. 27, 2021 for related Intl. App. No. PCT/IB2021/053231, from which the instant application is based, 16 pgs.

\* cited by examiner

MOULDING TRAY FOR MANUFACTURING SLABS MADE OF AGGLOMERATE MATERIAL, METHOD FOR REALIZING SUCH MOULDING TRAY AND METHOD FOR MANUFACTURING SLABS MADE OF AGGLOMERATE MATERIAL

RELATED APPLICATIONS

This application is a 35 U.S.C. 371 national stage filing from International Application No. PCT/IB2021/053231, filed Apr. 20, 2021, which claims priority to Italian Application No. 102020000008953, filed Apr. 24, 2020, the teachings of which are incorporated herein by reference.

FIELD OF THE INVENTION

The present invention relates to the manufacture of slabs of agglomerate material from a mix containing granules of stone material and a binder, preferably an organic resin.

In particular, the present invention relates to a moulding tray for manufacturing slabs of agglomerate material, as well as a method for realizing the moulding tray and a method for manufacturing slabs of agglomerate material which uses the moulding tray.

BACKGROUND

For some time processes for the manufacture of compacted articles, preferably in the form of slabs of agglomerate material, have been known, where an initial mix comprising a granular material and a hardening binder is prepared. The mix may also comprise further additives, such as thickening agents, pigments or filling materials.

In particular, the granular material is formed by granules or powders consisting of stone or stone-like material or expanded material and the binder is preferably a thermosetting resin.

Initially, the mix is distributed on a moulding support formed generally by a tray comprising a rim portion and a base portion which delimit a cavity which is designed to contain the mix and the dimensions of which correspond to the dimensions of the slab to be obtained.

The rim portion is formed by an elastomeric material and the base portion may be formed by at least one surface portion made of elastomeric material, preferably by at least one pair of layers of elastomeric material arranged in between at least one pair of fabric layers.

In the continuation of the description the expression "surface layer" is understood as meaning a layer having at least one surface exposed directly towards the external environment.

Examples of this type of tray are provided in Italian patent 0001297285 and in the Italian utility model 0000248137.

The elastomeric material is formed generally by synthetic rubbers, while the fabric is formed by polyamide or nylon weft threads and by polyester warp threads which are pretensioned in both directions.

In particular, the synthetic rubbers of the rim portion and the base portion may be chosen from within the group which comprises synthetic rubbers known as EPM, namely rubbers formed by ethylene and propylene copolymers, and synthetic rubbers called EPDM, namely ethylene-propylene-diene monomer rubbers.

In order to realize the finished tray, the rubber of the rim portion and the rubber of the base portion may be vulcanized separately and then combined by means of a further vulcanization step in order to rigidly join together the two portions, with the arrangement of a further rubber layer in between.

Alternatively, the rubbers of the base portion and the rim portion may be initially raw and then undergo subsequently the vulcanization process in order to join together the two portions.

The expression "raw rubbers" is understood as meaning rubbers which have not yet undergone the vulcanization process.

The tray manufacturing process is performed using known methods, for example by means of pressing and vulcanization of raw rubber compounds in a heated-surface press.

The compounds are firstly distributed in a metal forming mould with a profile corresponding to the profile of the tray to be obtained and positioned inside a heated-surface press.

In particular, the compounds of raw elastomeric material which are designed to form the base portion of the tray may be loaded into the press in the form of a "sandwich" or flexible panel comprising also the fabric layers.

The expression "flexible sandwich" is used in the present description in order to define a flexible panel comprising one or more layers of elastomeric material arranged between one or more fabric layers.

The hot-pressing operation causes vulcanization of the compounds and/or the raw rubber layers and consequently the joining of the rim portion together with the base portion of the tray.

One drawback which may arise during the tray manufacturing process consists in the fact that air bubbles may remain trapped in the rubbers or on their surfaces.

Moreover, the rubbers, as is usually the case in rubber articles, may comprise a filler material or filler and a crosslinking agent designed to allow the crosslinking of the compounds during the pressing step, in addition to additives of various kinds.

The filler provides the rubbers and therefore the tray thus obtained with the predetermined mechanical properties. The filler typically consists of carbon black which moreover gives the tray a black colour.

During the slab production process, the tray with the mix distributed inside it is firstly covered with a covering sheet of elastomeric material similar to the elastomeric material of the base of the tray, in order to form a sheath which encloses the mix.

The sheath is transported into a slab moulding station and then into a resin and mix hardening station.

In the moulding station the mix undergoes a compaction step preferably by means of vacuum vibro-compression, namely a step during which the mix is subjected to a vacuum compression action with simultaneous application of a vibratory movement with a predefined frequency, for a duration of nearly 100 seconds, in order to mould a slab.

The compacted-slab hardening and resin catalysis step is performed by means of heating of the mix. For this purpose, the hardening station preferably comprises catalysis ovens having a plurality of conductive heating surfaces within which the sheaths, formed by the tray with the covering sheet, containing the mix previously compacted to form the slab, are positioned.

The slab hardening step performed in the catalysis ovens requires a longer time than the time required for the moulding step, normally equal to about thirty minutes.

In particular, using a polyester resin as binder, the hardening step involves a heating period for heating the slab to the temperature for triggering catalysis, i.e. about 80° C.

(this period has a duration of 8-13 minutes), a transition period lasting 8-15 minutes during which there is a sudden increase in the temperature of the mix up to about 100° C. caused by the triggering of the exothermic catalysis reaction and a period of about 6-8 minutes during which the slab is kept at the catalysis temperature, namely about 100° C.

In this connection, the elastomeric materials, namely the rubbers, of the rim portion and base portion of the tray must have the following properties:

mechanical strength in order to contain the mix without undergoing substantial deformation during the slab compaction step;

resistance to working temperatures, depending on the type of binder used, during the hardening step, namely up to 150° C.

Below a specific indicative list of the particular characteristics of these rubbers is provided:

density: 1.05 kg/dm$^3$;

hardness: 64 Shore A;

abrasion resistance (according to the standard UNI 9185): 86 mm$^3$;

heat resistance: at least 150° C.;

vulcanization temperature: equal to or greater than 160° C.

During heating in the catalysis oven, the internal part of the compacted mix heats up after its external part, owing to the thermal conduction of the heat.

In order to ensure that the slab is flat after hardening, it is necessary to provide a uniform heat flow over the whole area of both sides of the slab; therefore the heating surfaces must have characteristics such as to ensure that the heating temperature is uniform over the whole area of each surface and also between one surface and another.

The formation of temperature gradients, namely differences in temperature between different parts or zones of the compacted mix, even minimal, during heating causes significant distortion of the hardened slab and this is not acceptable.

Moreover, in order to obtain perfectly flat slabs, it is necessary that the increase in temperature of the mix during the transition period should occur gradually and uniformly on both surfaces and throughout the thickness of the slab.

The overall duration of the hardening step, depending on the type of binding resin, depends to a large extent on the duration of the transition period, which in turn depends on the thickness of the compacted mix and its composition.

If the thickness of the compacted slab is greater and/or the thermal conduction coefficient of the mix is lower the heating is slower and therefore the duration of the transition period is greater.

Therefore, a first drawback of these slab production methods consists in the fact that the duration of the hardening step is about 15 times that required for the slab moulding step.

This drawback means that the catalysis oven must have a capacity for at least 15 sheaths, with a consequent increase in its size, its complexity and its costs.

In order to deal at least partially with this problem, methods and plants have been developed where there is an intermediate preheating step between the moulding step and the hardening step.

During this intermediate step, the mix undergoes dielectric preheating, by means of application of electromagnetic radiofrequency waves; this intermediate step ensures uniform and quick preheating of the compacted mix such that the cycle has an overall duration comparable with that of the moulding step.

Moreover, the electromagnetic radiofrequency waves allow uniform heating of the mix also internally by means of transformation of the electromagnetic energy into thermal energy.

An example of this type of method and plant is illustrated and described in Italian patent application No. TV2004A000019.

In an alternative embodiment with respect to that described above, the said hardening step may also be performed by means of application of electromagnetic radiofrequency waves to the mix; obviously, in this embodiment, the catalysis ovens with conductive surfaces would not be present in the plant because they are not necessary.

Despite the fact these solutions are widely established on the market, they are not without drawbacks.

One drawback of these solutions consists in the fact that the electromagnetic radiofrequency waves tend to be absorbed mainly by the elastomeric materials of the trays, in particular in the case where these materials comprise carbon block as a structural or reinforcing filler.

Carbon black is particularly conductive and the absorption of the electromagnetic radiofrequency waves may cause overheating of the tray with the possibility of sparking occurring.

Overheating results in rapid deterioration of the trays which must therefore be frequently replaced.

BRIEF SUMMARIES OF OBJECTS OF THE INVENTION

The main object of the present invention is to provide a moulding tray for manufacturing slabs of agglomerate material from a mix, as well as a method for realizing the moulding tray and a method for manufacturing the slabs, which are able to overcome the aforementioned drawbacks.

A particular task of the present invention is to provide a tray of the type described above which is able to be subjected to electromagnetic radiofrequency waves for efficient preheating of the mix, but which at the same is prone only to a minimum and small degree of overheating.

A further task of the present invention is to provide a tray of the type described above which has mechanical properties comparable to those of the trays known in the sector.

Another task of the present invention is to provide a tray of the type described above which is particularly resistant to wear and deterioration even after various slab production cycles.

A further task of the present invention is to provide a method for realizing the tray which requires a limited number of implementation measures compared to the manufacturing methods known in the sector.

Another task of the present invention is to provide a method for realizing the tray which is able to limit the trapping of air bubbles between the surfaces of the metal moulds and the compounds of elastomeric material, as well as between the compounds loaded into the metal moulds.

A further task of the present invention is to provide a method for manufacturing slabs of agglomerate material which uses radiofrequency at least for preheating of the mix.

The aforementioned object and main tasks are achieved with a moulding tray for manufacturing slabs of agglomerate material according to claim 1, with a method for realizing the moulding tray according to claim 9, and with a method for manufacturing slabs of agglomerate material according to claim 21.

BRIEF DESCRIPTIONS OF THE DRAWINGS

In order to illustrate more clearly the innovative principles of the present invention and its advantages compared to the prior art, non-limiting examples of embodiment will be described below with the aid of the accompanying drawings. In the drawings.

DETAILED DESCRIPTION OF EMBODIMENTS OF THE INVENTION

Figure 1:
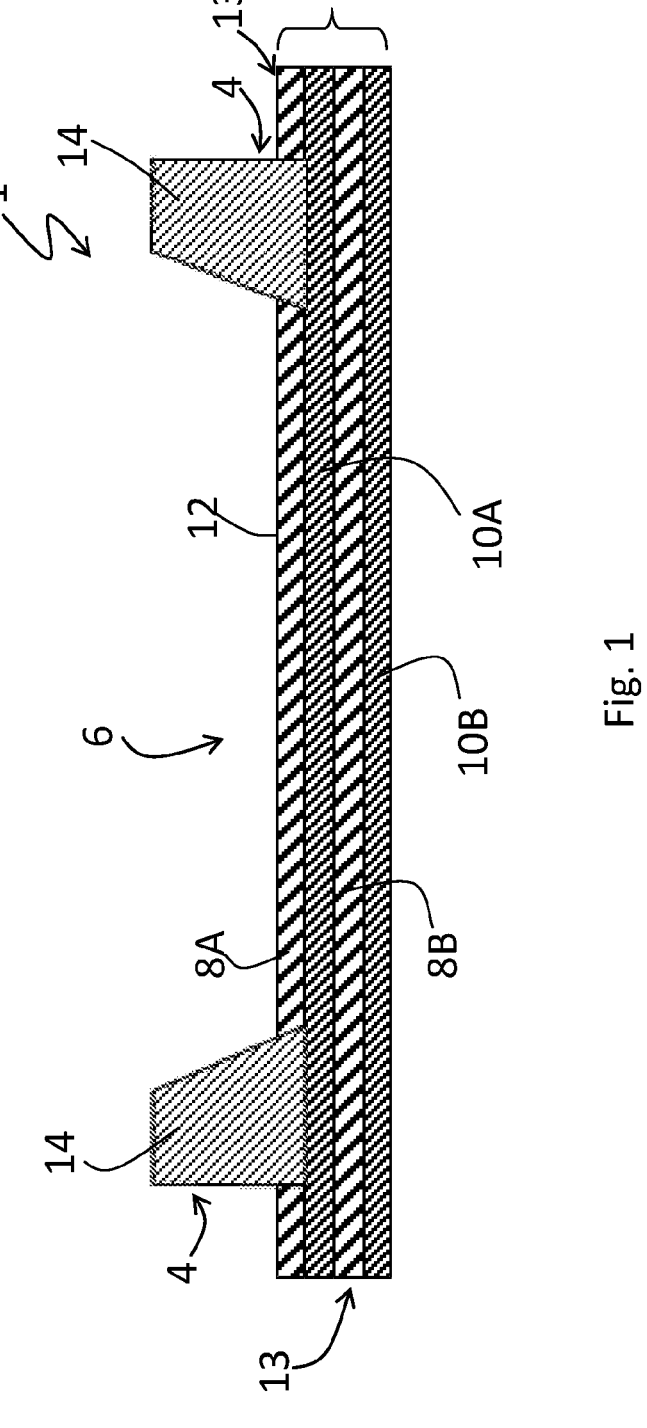
FIG. 1 shows a cross-sectioned front view of the moulding tray according to the present invention.

FIG. 1 shows a moulding tray for manufacturing slabs of agglomerate material according to the present invention, denoted overall by the reference number 1.

The slabs are obtained from a mix, not shown in the figures, containing granular material and a binder. The granular material comprises granules or powders consisting of stone, stone-like or expanded material and the binder consists for example an organic resin of the thermosetting type, preferably a polyester resin.

Moreover, the mix may comprise further components such as thickening agents, pigments or filling material.

The process for manufacturing the slabs, which also forms the subject of the present invention, essentially involves the following steps:

preparing a mix by mixing together granules of stone or stone-like material which have a predetermined particle size with a binder consisting of an organic resin;

distributing the mix on the tray so as to form a layer of mix;

moulding and compacting the mix contained inside the tray so as to obtain a slab which is compacted, preferably by means of a vacuum-compression action with simultaneous application of a vibratory movement with a predefined frequency.

heating the compacted slab so as to allow catalysis of the organic resin and hardening of the mix; the heating step is performed preferably in special catalysis ovens having a plurality of conductive heating surfaces on which the trays with the previously compacted mix are positioned.

Before the moulding step, the tray containing the mix is preferably covered with a covering sheet of elastomeric material so as to form a sheath which encloses the mix.

Advantageously, the method for manufacturing the slabs also comprises a step for dielectric preheating of the compacted slab which is performed downstream of the moulding step and upstream of the heating step.

The preheating step is preferably performed by means of application onto the mix of electromagnetic waves within the radiofrequency range, having frequencies less than 300 MHz and preferably between 3 and 30 MHz.

For example, the electromagnetic radiofrequency waves used in the method for manufacturing the slabs may have a frequency of about 27 MHz.

Alternatively, the radiofrequency may be used to perform the mix hardening step; in this alternative embodiment the plant does not comprise therefore the catalysis ovens with conductive surfaces because they are no longer necessary.

As shown more clearly in FIG. 1, the tray 1 comprises a base portion 2 and a rim portion 4 which delimit a cavity 6 for containing the mix.

The rim portion 4 is made of elastomeric material and the base portion 2 comprises at least one surface layer 8A made of elastomeric material and at least one fabric layer 10A.

Advantageously, the rim portion 4 and the at least one surface layer 8A of the base portion 2 may be made of the same elastomeric material.

In particular, the elastomeric material of the rim portion 4 and/or the elastomeric material of the at least one surface layer 8A of the base portion 2 may be chosen from within the group which comprises ethylene-propylene rubbers (EPM) and ethylene-propylene-diene monomer rubbers (EPDM).

Ethylene-propylene rubbers and ethylene-propylene-diene monomer rubbers may be obtained from renewable plant sources.

The elastomeric materials of the rim portion 4 and of the at least one surface layer 8A of the base portion 2 further comprise a structural or reinforcing filler and normally a crosslinking agent, in addition to any additives.

In the embodiment shown in FIG. 1, the base portion 2 comprises at least one pair of layers of elastomeric material 8A, 8B which are arranged in between at least one pair of fabric layers 10A, 10B.

A different number of layers of elastomeric material 8A, 8B and of fabric layers 10A, 10B may also be envisaged, depending on the necessary manufacturing requirements.

Both the layers of elastomeric material 8A, 8B may be made using the rubbers described above and may comprise the same filler, while the fabric layers 10A, 10B may be made using polyamide or nylon weft threads and polyester warp threads which are pretensioned in both directions.

Moreover, the layers 8A, 8B and 10A and 10B may have the same thickness, as shown in FIG. 1, or different thicknesses, without thereby departing from the scope of protection of the present invention.

As shown in FIG. 1, the bottom 12 of the cavity 6 of the tray 1 is formed by a surface layer of elastomeric material 8A of the base portion 2, while the side walls 14 of the cavity 6 are formed by the rim portion 4.

The fabric layer 10A, the further layer of elastomeric material 8B and the further fabric layer 10B are arranged in succession below the surface layer of elastomeric material 8A.

From FIG. 1 it can also be seen that the elastomeric material of the layer 8A which forms the bottom 12 of the cavity 6 and the perimetral wings 13 is missing in the area of the rim portion 4.

As shown in FIG. 1, the perimetral wings 13 form the ends of the base portion 2 which project outwards with respect to the rim portion 4 and may be formed, not only by the surface layer 8A made of elastomeric material, but also by the other layer 8B of elastomeric material and by the fabric layers 10A, 10B.

The rim portion 4 is joined at its base to the fabric layer 10A immediately below the surface layer 8A made of elastomeric material which forms the bottom 12 of the cavity 6 and the perimetral wings 13.

The edge of the elastomeric material layer 8A of the bottom 12 is in contact with the inner surface of the rim portion 4 and the edge of the layer 8A of the side wings 13 is in contact with the outer surface of the rim portion 4.

This characteristic feature will be further explained in the continuation of the description with reference to the method for realizing the tray 1.

Alternatively, according to an embodiment not shown in the figures, the elastomeric material may be present also in the area of the surface layer 8A opposite the rim portion 4.

In this embodiment, the layer of elastomeric material 8A extends over the entire surface and the rim portion 4 is directly joined together with the surface layer 8A.

In accordance with a particular aspect of the invention, the filler present in the elastomeric material of the at least one surface layer 8A of the base portion 2 and in the elastomeric material of the rim portion 4 contains silicon (Si).

Preferably, the filler consists of silica ($SiO_2$), which is optionally of the pyrogenic type or obtained from different sources, such as rice husk. Silica is a compound of silicon.

This type of filler has an absorption coefficient in the radiofrequency range significantly lower than the absorption coefficient of carbon black, which is generally used as a filler in this sector.

Therefore, with this measure it is possible to avoid overheating of the trays during the radiofrequency mix preheating step described above and deterioration of the trays, allowing them to be used again.

Moreover, the silica used as filler, for example pyrogenic silica or that obtained from rice husk, can be used to obtain trays having mechanical properties which are comparable to the mechanical properties of the trays which contain carbon black as filler.

Other fillers containing a silicon compound other than silica may also be envisaged, this without departing from the scope of protection of the present invention; however, if used, these fillers must provide the tray with mechanical properties similar to those provided by silica.

The invention also relates to a method for realizing a moulding tray 1 of the type described above.

In a preferred embodiment of the invention, the method comprises the following steps:

a) providing a mould 16, typically made of steel, comprising a shaped peripheral cavity 18;

b) positioning the mould 16 in a press comprising a bottom surface 22 and a top surface 24; at least one of these two surfaces being heated and at least one of the surfaces being movable with respect to the other surface along a vertical direction;

c) distributing inside the cavity 18 of the mould 16 a raw elastomeric material compound M, i.e. one which has not been vulcanized yet.

d) positioning a flexible sandwich P comprising at least one layer 8A of raw elastomeric material and at least one fabric layer 10A above the mould 16 and the compound M previously distributed inside the cavity 18 of the mould 16;

e) moving the top movable surface 24 (or alternatively the bottom movable surface 22) so as to obtain a closed position of the press;

f) pressing and heating with consequent vulcanization of the raw elastomeric materials of the compound M and the at least one layer 8A of the flexible sandwich P.

Figure 2A:
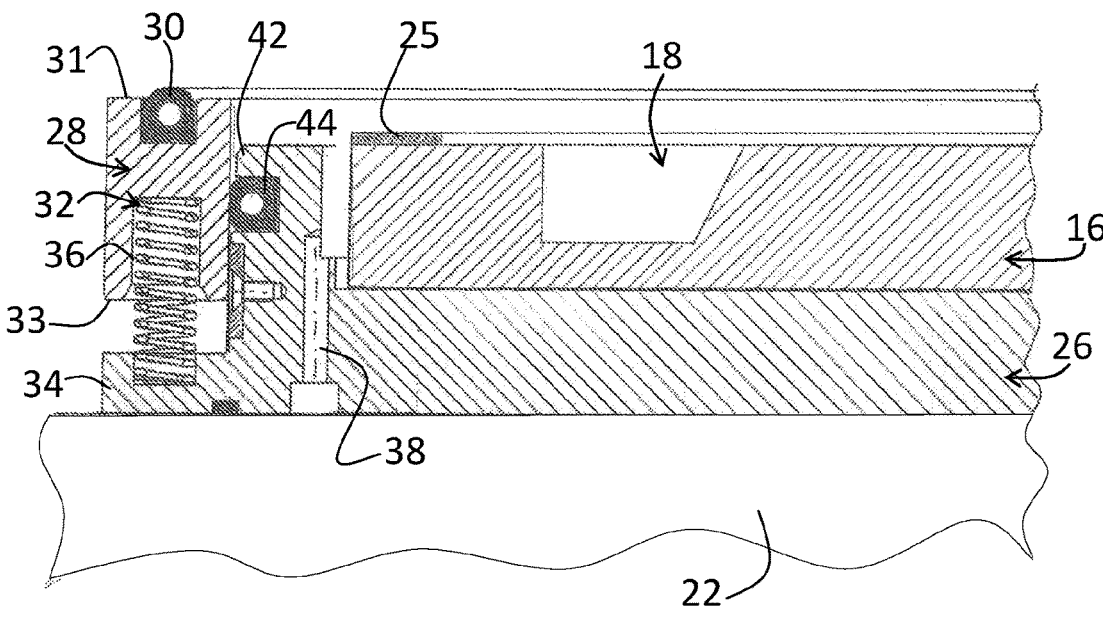
FIGS. 2a-2d show partial cross-sectioned front views of a mould and of a portion of pressing surfaces of a press for realizing the tray, in different operating configurations.
Figure 2B:
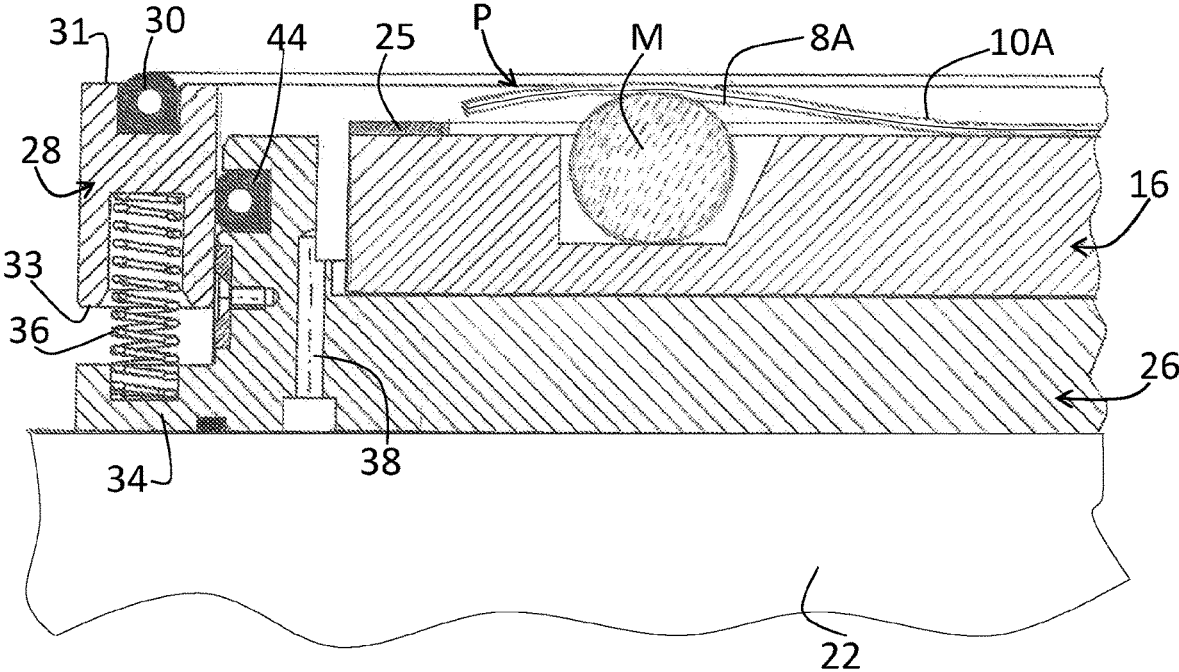
Figures 2C, 2D:
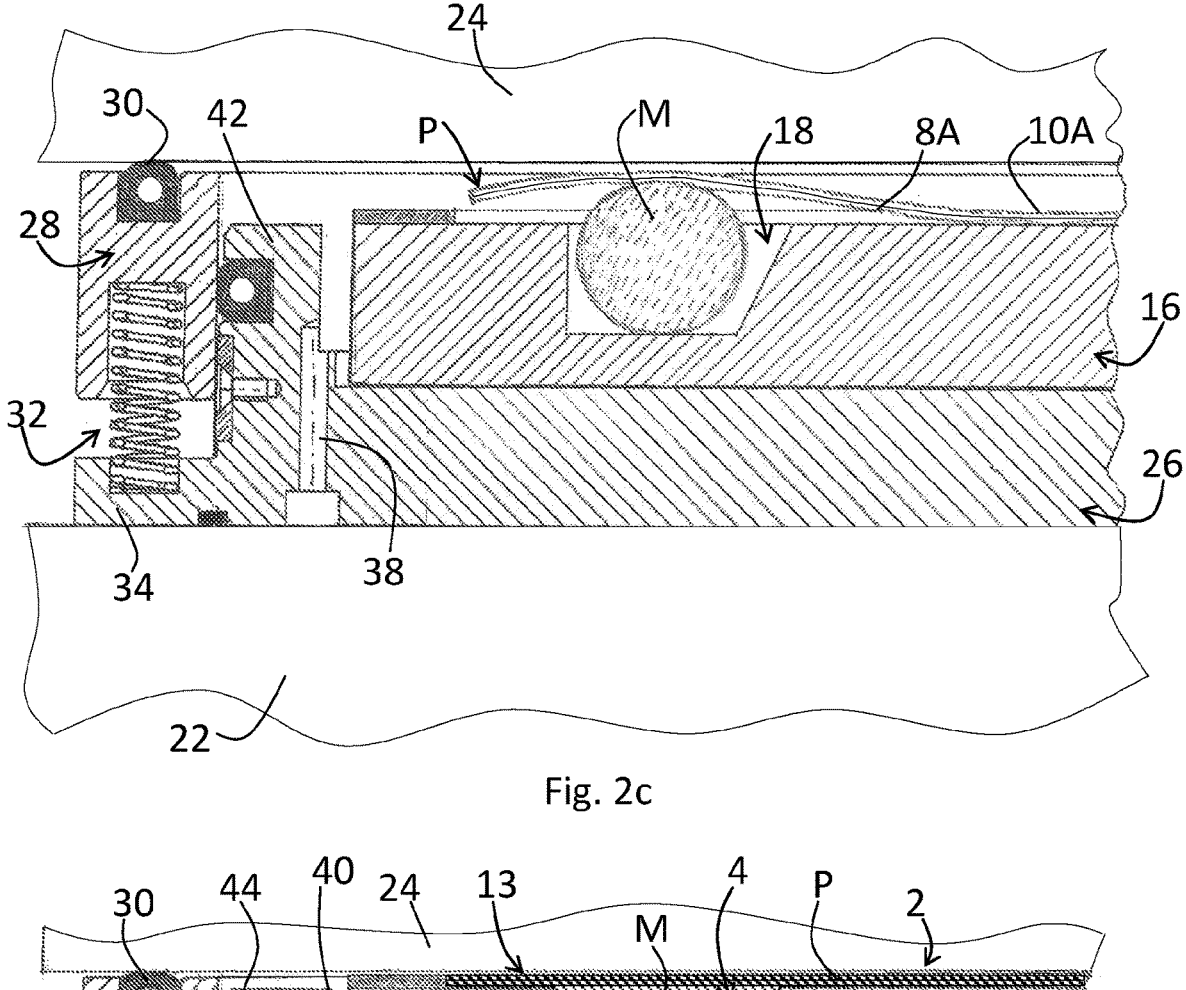

The steps a) and b) are shown in FIG. 2a, the steps c) and d) are shown in FIG. 2b, the step e) is shown in FIG. 2c and the step f) is shown in FIG. 2d.

The expression "bottom heated surface" of the press is understood as referring to the heated surface 22 situated at a smaller distance from the ground, while the expression "top heated surface" is understood as referring to the heated surface 24 situated at a greater distance from the ground.

The elastomeric material compound M distributed inside the cavity 18 is intended to form the rim portion 4 of the tray 4 at the end of the pressing step f), while the flexible sandwich P is intended to form the base portion 2 and, where necessary, the perimetral wings 13 of the tray 1 at the end of the pressing step f).

In FIGS. 2b and 2c, the raw elastomeric material compound M is shown as an extruded profiled element with a circular cross-section positioned inside the cavity 18 of the mould 16; however the compound M may also have different forms or configurations, without thereby departing from the scope of protection of the present invention.

As already indicated above, the manufacturing method differs in that the raw elastomeric material compound M and the raw elastomeric material of the at least one layer 8A of the flexible sandwich P comprise a filler containing silicon (Si).

In particular, the filler consists of silica ($SiO_2$), optionally consisting of pyrogenic silica or silica obtained from other sources, such as rice husk. The advantages of using this filler are the same described above with reference to the tray 1.

In the figures, the movable surface is the top surface 24, while the bottom surface 22 is fixed; however, it is possible to provide a movable bottom surface and a fixed top surface, without thereby departing from the scope of protection of the present invention.

The means for moving the heated surfaces are of the type known per se and therefore will not be described in detail in the present description. Moreover, in a preferred embodiment of the invention, both the surfaces 22, 24 of the press are heated.

As shown in FIG. 2d, the top heated surface 24 in the closed position after being moved is contact with the flexible sandwich P intended to form the base portion 2 and the perimetral wings 13 of the tray 1.

The flexible sandwich P may comprise, as already indicated above for the base portion 2 of the tray 1, at least one pair of layers 8A, 8B made of a raw elastomeric material and arranged between at least one pair of fabric layers 10A, 10B.

For the sake of simplicity, FIGS. 2a-2d show a sandwich P comprising only one layer of elastomeric material 8A and one fabric layer 10A. The sandwich P is positioned inside the press above the mould 16 with a layer of elastomeric material 8A directed towards the mould 16.

Moreover, the mould 16 may comprise a peripheral stop element 25 having a suitable thickness and designed to retain the elastomeric material which is subjected to high pressure during vulcanization, in particular during the step where there is maximum fluidity. Moreover, the stop element is designed to define the thickness of the vulcanized flexible sandwich P.

Suitably, the method envisages that the pressing step f) is performed in a vacuum environment, namely where there is no air, in order to prevent air bubbles being trapped on the surfaces and between the surfaces of the metal mould 16 and the compound, as well as between the compound M and the flexible sandwich P; the presence of air bubbles would in fact negatively affect the quality of the tray.

In order to realize the hot-pressing vacuum environment a special mould-holder element 26 which is suitably configured and shown in FIGS. 2a-2d may, for example, be used.

This mould-holder element 26 is provided with a movable frame 28 and it is envisaged performing an initial step of arranging and fixing the mould-holder element 26 on the bottom heated surface 22 of the press in order to create the vacuum pressing environment before and during the pressing step f), as explained in detail below.

The metal mould 16 is fixed to the mould-holder element 26 with the peripheral shaped cavity 18 directed towards the top heated surface 24.

The frame 28 of the mould-holder element 26 is movable along a vertical direction and is provided with at least one upper seal 30 positioned on the top side 31, namely the side facing the top heated surface 24 in the working configuration.

The function of this upper seal 30 will be clarified in the continuation of the present description.

Advantageously, the frame 28 comprises elastic means 32 arranged between the bottom face 33 of the frame 28 and a projecting edge 24 of the mould-holder element 26.

As shown in FIGS. 2a-2d, the elastic means 32 comprise a series of springs 36 which are designed to keep raised, namely at a distance from the projecting edge 34, the frame 28 in the rest condition.

Suitably, the mould-holder element 26 also comprises a side wall 42 having a surface directed towards the movable frame 28; a further lateral seal 44 making contact with the frame 28 is fixed onto this surface.

Moreover, the mould-holder element 26 comprises at least one suction through-duct 38 for drawing off the air, the function of which will be clarified below.

When it is lowered, the top heated surface 24 comes into contact with the upper seal 30 and therefore with the frame 28 until it rests against the stop element 25 before coming into contact with the flexible sandwich P, pushing the movable frame 28 downwards owing to the compression of the springs 36.

In the closed position, the top heated surface 24, the mould-holder element 26 and the frame 28 delimit a closed chamber 40, as shown in FIG. 2d.

The suction duct 38 indicated above has an opening in fluid communication with the chamber 40 and another opening intended to be connected to air suction means, not shown in the figures.

By means of this arrangement it is possible to perform suction of the air and formation of the vacuum inside the chamber 40, before the movable surface 40 comes into contact with the flexible sandwich P and before and during the pressing step f), making pressing in a vacuum environment possible.

The upper seal 30 and the lateral seal 44 therefore have the function of sealing off the vacuum inside the chamber 40 during the pressing step f).

The creation of the vacuum prevents air bubbles from remaining trapped between the surfaces of the metal mould 16 and the compound, as well as between the compound M and the flexible sandwich P.

The method may also comprise a step of removal of the raw elastomeric material of the layer 8A of the flexible sandwich P directed towards the mould 16 in the peripheral area facing the cavity 18 of the mould 16 and therefore in the area intended to come into contact with the compound M contained inside the cavity 18. This step is not shown in the figures.

By means of this measure the raw elastomeric material compound M contained inside the cavity 18 is joined to the fabric layer 10A close to the layer of elastomeric material 8A during the pressing step.

From the above description it is now clear how the tray for manufacturing slabs and the method for realizing it, as well as the method for manufacturing the slabs of agglomerate material are able to achieve the predefined objects.

In particular, by using silica as a filler it is possible to avoid overheating of the tray following application of the radiofrequency during the mix preheating step or the hardening step.

As a result of this measure it is possible to avoid sparking phenomena affecting the trays during application of the radiofrequency, such that the trays may be used again.

Moreover, by creating the vacuum during the method for realizing the trays it is possible to prevent air bubbles being trapped in the elastomeric materials of the tray, thus obtaining a defect-free tray.

Obviously, the above description of the embodiments applying the innovative principles of the present invention is provided by way of example of these principles and must therefore not be regarded as limiting the scope of the rights claimed herein. For example, types of press different from that described or different forms and configurations of the mould may be envisaged.

The invention claimed is:

1. A moulding tray for manufacturing slabs made of agglomerate material from a mix, the tray comprising a base portion;

wherein the base portion comprises at least one surface layer made of elastomeric material and at least one fabric layer;

wherein said moulding tray comprises a rim portion made of elastomeric material and designed to delimit together with said base portion a cavity for containing the mix, the elastomeric material of the rim portion and the elastomeric material of the at least one surface layer of the base portion comprising a filler containing silicon; and characterized in that said at least one surface layer of the base portion and said rim portion are independent parts of the moulding tray and that the elastomeric material of the rim portion and the elastomeric material of the at least one surface layer of the base portion are chosen from the group comprising ethylene-propylene rubbers (EPM) and ethylene-propylene-diene monomer rubbers (EPDM).

2. The tray according to claim 1, characterized in that said filler is silica ($SiO_2$).

3. The tray according to claim 2, characterized in that said filler is pyrogenic silica.

4. The tray according to claim 2, characterized in that said filler is silica obtained from rice husk.

5. The tray according to claim 1, characterized in that said base portion comprises at least one pair of layers of elastomeric material arranged in between at least one pair of fabric layers.

6. The tray according to claim 1, characterized in that said rim portion and the at least one surface layer of said base portion are made of the same elastomeric material.

7. The tray according to claim 1, characterized in that the ethylene-propylene rubbers (EPM) or ethylene-propylene-diene monomer rubbers (EPDM) are obtained from renewable plant sources.

8. The tray according to claim 1, characterized in that the at least one surface layer of elastomeric material of said base portion forms the bottom of said cavity, said rim portion being joined at its base to the fabric layer situated immediately underneath said at least one surface layer of elastomeric material which forms the bottom of the cavity.

9. A method for realizing a moulding tray for manufacturing slabs of agglomerate material from a mix according to claim 1, the method comprising the following steps:

(a) providing a mould comprising a peripheral shaped cavity;

(b) positioning said mould in a press comprising a bottom surface and a top surface, at least one of said surfaces being movable along a vertical direction, one or both said surfaces being heated;

(c) distributing a compound of raw elastomeric material inside the cavity of said mould;

(d) positioning a flexible sandwich above said mould and said compound, said flexible sandwich comprising at least one layer of raw elastomeric material and at least one fabric layer;

(e) moving the movable surface so as to obtain a closed position of the press;

(f) pressing and heating with consequent vulcanization of the raw elastomeric materials of the compound and of the at least one layer of said flexible sandwich;

wherein the raw elastomeric material compound is intended to form the rim portion of said tray and the flexible sandwich is intended to form the base portion of said tray;

characterized in that the raw elastomeric materials of said compound and of the at least one layer of the flexible sandwich comprise a filler containing silicon, that said at least one surface layer of the base portion and the rim portion are independent parts of the moulding tray, and that the elastomeric material of the rim portion and the elastomeric material of the at least one surface layer of the base portion are chosen from the group comprising ethylene-propylene rubbers (EPM) and ethylene-propylene-diene monomer rubbers (EPDM).

10. The method according to claim 9, characterized in that said filler is silica ($SiO_2$).

11. The method according to claim 10, characterized in that said filler is pyrogenic silica.

12. The method according to claim 10, characterized in that said filler is silica obtained from rice husk.

13. The method according to claim 9, characterized in that the pressing and heating step (f) is performed in a vacuum environment in order to prevent air bubbles from remaining trapped on the surfaces, between the surfaces of the mould and the compound and between the compound and the flexible sandwich.

14. The method according to claim 13, comprising an initial step of arranging and fixing a mould-holder element on the bottom surface of said press, said mould being fixed onto said mould-holder element and said mould-holder element being suitable for creating a vacuum pressing environment before and during said pressing step (f).

15. The method according to claim 14, characterized in that said mould-holder element comprises at least one air suction duct intended to be connected to air suction means.

16. The method according to claim 15, characterized in that said mould-holder element comprises a frame movable along a vertical direction.

17. The method according to claim 16, characterized in that in said closed position said top surface, said mould-holder element and said frame delimit a closed chamber and in that a suction step is envisaged for drawing off the air through the at least one air suction duct in order to create the vacuum inside said chamber before and during the pressing step.

18. The method according to claim 17, characterized in that said frame comprises at least one upper seal and said mould-holder element comprises a lateral seal for sealing off the vacuum inside said chamber during said pressing step (f).

19. The method according to claim 9, characterized in that said flexible sandwich comprises at least one pair of layers of raw elastomeric material arranged between at least one pair of fabric layers.

20. The method according to claim 19, characterized in that said flexible sandwich is positioned in said press with said layer of raw elastomeric material directed towards said mould, there being provided a step for removal of the elastomeric material from said layer in the area intended to come into contact with the elastomeric material compound during the pressing step.

21. A method for manufacturing slabs of agglomerate material comprising in succession the following steps:

preparing a mix by mixing together granules of stone or stone-like material which have a predetermined particle size with a binder consisting of an organic resin;

distributing said mix on a tray so as to form a layer of mix;

moulding and compacting the mix by means of vacuum compression of the mix in order to obtain a compacted slab;

dielectric preheating of the compacted slab by means of application of electromagnetic radiofrequency waves with a frequency of less than 300 MHz;

heating the compacted slab so as to allow hardening of the mix and catalysis of the organic resin;

characterized in that the tray is of the type according to claim 1.

\*    \*    \*    \*    \*